(12) United States Patent
Wu

(10) Patent No.: US 12,427,433 B1
(45) Date of Patent: Sep. 30, 2025

(54) GAMEPAD ADAPTABLE TO DIFFERENT SPECIFICATIONS OF GAME CONSOLE CONTROLLERS

(71) Applicant: Shenzhen Lidacheng Technology Co., Ltd., Shenzhen (CN)

(72) Inventor: Jincheng Wu, Shenzhen (CN)

(73) Assignee: Shenzhen Lidacheng Technology Co., Ltd., Shenzhen (CN)

( * ) Notice: Subject to any disclaimer, the term of this patent is extended or adjusted under 35 U.S.C. 154(b) by 0 days.

(21) Appl. No.: 19/075,858

(22) Filed: Mar. 11, 2025

(30) Foreign Application Priority Data

| Dec. 31, 2024 | (CN) | 202411984365.2 |
| Jan. 27, 2025 | (CN) | 202510126257.X |
| Jan. 27, 2025 | (CN) | 202520176186.X |

(51) Int. Cl.
*A63F 13/98* (2014.01)
*A63F 13/24* (2014.01)
*A63F 13/245* (2014.01)

(52) U.S. Cl.
CPC .............. *A63F 13/98* (2014.09); *A63F 13/24* (2014.09); *A63F 13/245* (2014.09)

(58) Field of Classification Search
CPC ......... A63F 13/98; A63F 13/24; A63F 13/245
See application file for complete search history.

(56) References Cited

U.S. PATENT DOCUMENTS

| 8,469,815 | B2 * | 6/2013 | Hovseth | A63F 13/803 463/36 |
| 8,565,843 | B1 * | 10/2013 | Lugo | H04M 1/04 455/575.4 |
| 9,895,606 | B1 * | 2/2018 | Kamata | A63F 13/235 |
| 12,274,933 | B2 * | 4/2025 | Lu | A63F 13/23 |
| 2010/0195279 | A1 * | 8/2010 | Michael | G06F 1/1632 361/679.41 |
| 2011/0077061 | A1 * | 3/2011 | Danze | H04M 1/185 455/575.1 |
| 2013/0058659 | A1 * | 3/2013 | Umezu | A63F 13/235 398/128 |
| 2013/0109476 | A1 * | 5/2013 | Baum | A63F 13/235 463/37 |
| 2013/0184077 | A1 * | 7/2013 | Galpern | A63F 13/24 463/37 |
| 2014/0200085 | A1 * | 7/2014 | Bares | A63F 13/98 463/47 |
| 2018/0059758 | A1 * | 3/2018 | Boatner | H02J 50/10 |
| 2019/0075900 | A1 * | 3/2019 | Hynecek | A45C 11/00 |
| 2019/0351336 | A1 * | 11/2019 | Fletcher | A63F 13/98 |
| 2021/0346794 | A1 * | 11/2021 | Gao | A63F 13/98 |
| 2024/0149163 | A1 * | 5/2024 | O'Connor | A63F 13/537 |
| 2024/0189705 | A1 * | 6/2024 | Dornbusch | A63F 13/98 |

* cited by examiner

*Primary Examiner* — Dmitry Suhol
*Assistant Examiner* — Carl V Larsen
(74) *Attorney, Agent, or Firm* — Jose Cherson Weissbrot

(57) ABSTRACT

A gamepad adaptable to different specifications of game console controllers, comprising a gamepad body, wherein the gamepad body is provided with a first mounting structure for placing a first game console controller and a second mounting structure for placing a second game console controller, the first mounting structure is used to place the first game console controller, and the second mounting structure is used to place the second game console controller. The gamepad is suitable for at least two specifications of game console controllers, providing the practicality of the gamepad, and reducing the use cost of the users.

6 Claims, 6 Drawing Sheets

GAMEPAD ADAPTABLE TO DIFFERENT SPECIFICATIONS OF GAME CONSOLE CONTROLLERS

TECHNICAL FIELD

The invention relates to a game device, in particular to a gamepad adaptable to different specifications of game console controllers.

BACKGROUND ART

On Mar. 20, 2017, the applicant applied for an invention patent Steering Wheel Type Gamepad with publication number of CN206660579U. The steering wheel type gamepad comprises a steering wheel shell, the steering wheel shell has an annular outer ring for the user to grasp, a placing slot is arranged in the middle of the annular outer ring, and a game console controller arranged on a game console is placed in the placing slot. The technical proposal of this invention can solve the problems in the prior art that the grasping feeling of the game console controller arranged on Nintendo Switch game console is poor and the user's experience quality is reduced.

Due to the continuous upgrading of game products, new game console controllers are also constantly created. The above-mentioned gamepad can only adapt to one specification of game controller and has poor adaptability.

SUMMARY OF THE INVENTION

To solve the technical problem that the steering wheel type gamepad in the prior art can only adapt to a game controller of one size and specification and has poor adaptability, the invention provides a gamepad adaptable to different specifications of game controllers.

To realize the above purpose, the invention adopts the following technical proposal: a gamepad adaptable to different specifications of game console controllers comprises a gamepad body, wherein the gamepad body is provided with a first mounting structure for placing a first game console controller and a second mounting structure for placing a second game console controller.

Preferably, the first mounting structure is a first controller holding cavity, and the shape and size of the first controller holding cavity are adapted to the first game console controller.

Preferably, the second mounting structure is an embedded sleeve with a second controller holding cavity, the embedded sleeve is removably embedded in the first controller holding cavity, and the shape and size of the second controller holding cavity are adapted to the second game console controller.

Preferably, the gamepad body is provided with a switching control key linked with a control key on the game console controller, and the switching control key can be linked with the control key of the first game console controller; the second mounting structure is provided with a linkage key connected with the switching control key, and the linkage key is used for linkage with the control key of the second game console controller.

Preferably, the gamepad body is provided with a key hole connected with the first controller holding cavity, the switching control key comprises a pressing part and a pressing column fixedly connected with the pressing part, and the pressing column is inserted in the key hole and can be linked with the control key of the first game console controller or linked with the linkage key of the second mounting structure.

Preferably, the gamepad body is provided with a first grasping notch part convenient for taking and placing the first game console controller.

Preferably, the second mounting structure is provided with a second grasping notch part for easily taking and placing the second game console controller.

Preferably, the embedded sleeve is provided with a protruding flange, and the flange is butted with the gamepad body when the embedded sleeve is embedded in the first controller holding cavity.

Preferably, a sunken clamping slot is arranged on the inside wall of the gamepad body facing towards one side of the first controller holding cavity; a protruding convex part is arranged on the outside wall of the embedded sleeve; the convex part is clamped in the clamping slot.

By adopting the above technical proposal, the gamepad provided by the invention has the following advantages:

1. the first mounting structure is used to place the first game console controller, and the second mounting structure is used to place the second game console controller; the gamepad is suitable for at least two specifications of game console controllers, providing the practicality of the gamepad, and reducing the use cost of the users.
2. the second mounting structure is directly arranged as the first controller holding cavity, not increasing the volume of the gamepad; the embedded sleeve adopts the removable structure, so that only different specifications of embedded sleeves are matched if a third game console controller and a fourth third game console controller are provided, thus increasing the applicability of the gamepad;
3. the switching control key and the linkage key ensure that the game console controller is simply and easily controlled through the gamepad.

When a larger game console controller needs to be placed, the embedded sleeve is removed from the first controller holding cavity, the larger game console controller is placed in the first controller holding cavity, and the corresponding function keys on the game console controller can be controlled through the switching control key.

When a smaller game console controller needs to be placed, the embedded sleeve is embedded in the first controller holding cavity, the smaller game console controller is placed in the second controller holding cavity, the linkage key is driven by the switching control key to control the corresponding function keys on the game console controller, so that the gamepad is adaptable to different specifications of game console controllers and more adaptable.

BRIEF DESCRIPTION OF THE DRAWINGS

The invention is described in detail in combination with the embodiments and the drawings.

1. Gamepad body; 11. Front shell; 12. Rear shell; 13. First mounting structure; 131. First controller holding cavity; 14. Second mounting structure; 140. Embedded sleeve; Second controller holding cavity; 142. Linkage groove; 143. Linkage key; 144. Second grasping notch part; 145. Flange; 146. Convex part; 15. Switching control key; 151. Pressing part; 152. Pressing column; 16. Key hole; 17. First grasping notch part; 18. Clamping slot.

DETAILED DESCRIPTION OF THE INVENTION

The embodiments of the invention are further elaborated below in combination with the drawings.

Figure 1:
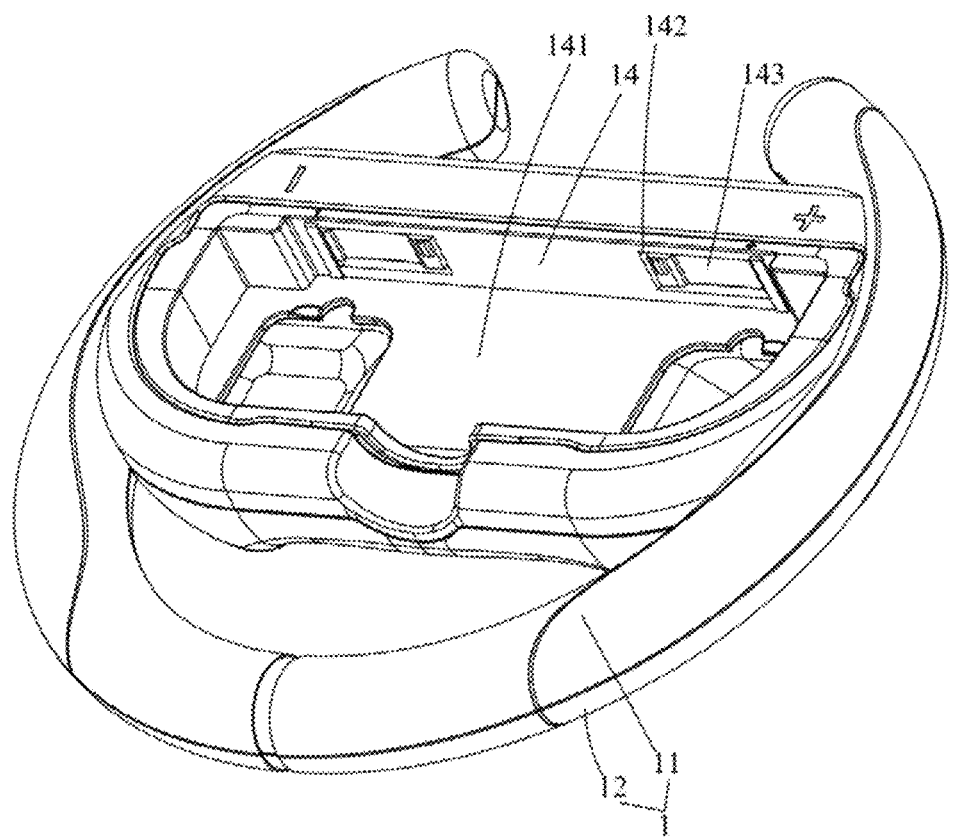
FIG. 1 is the overall structure diagram 1 for the embodiment 1 of the gamepad adaptable to different specifications of game console controllers in the invention.
Figure 2:
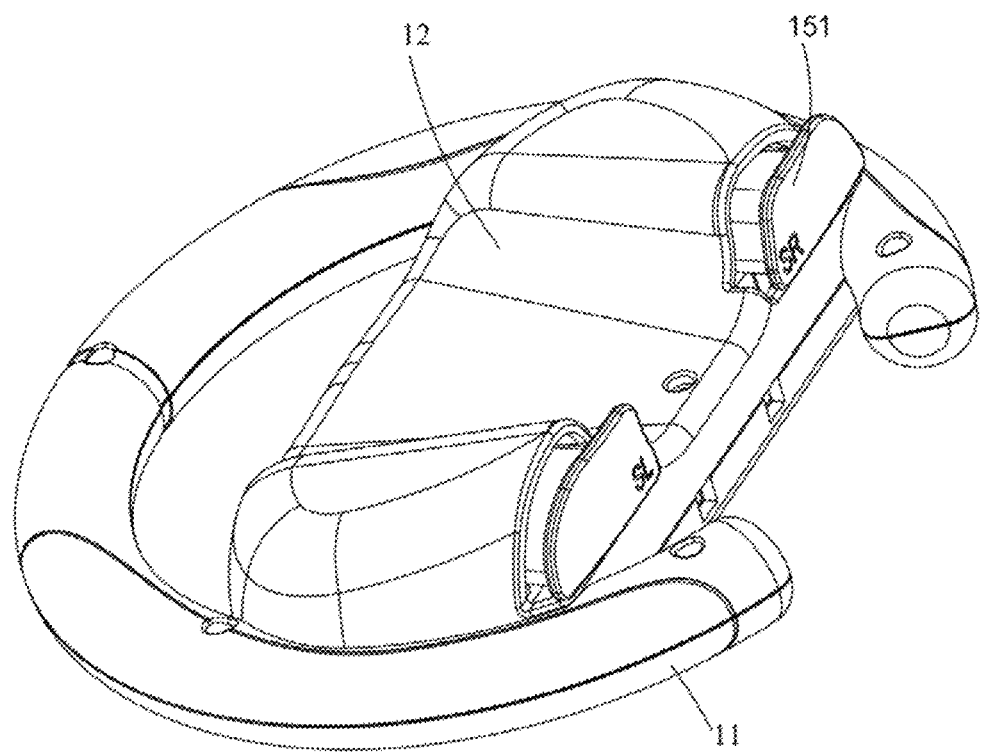
FIG. 2 is the overall structure diagram 2 for the embodiment 1 of the gamepad adaptable to different specifications of game console controllers in the invention.
Figure 3:
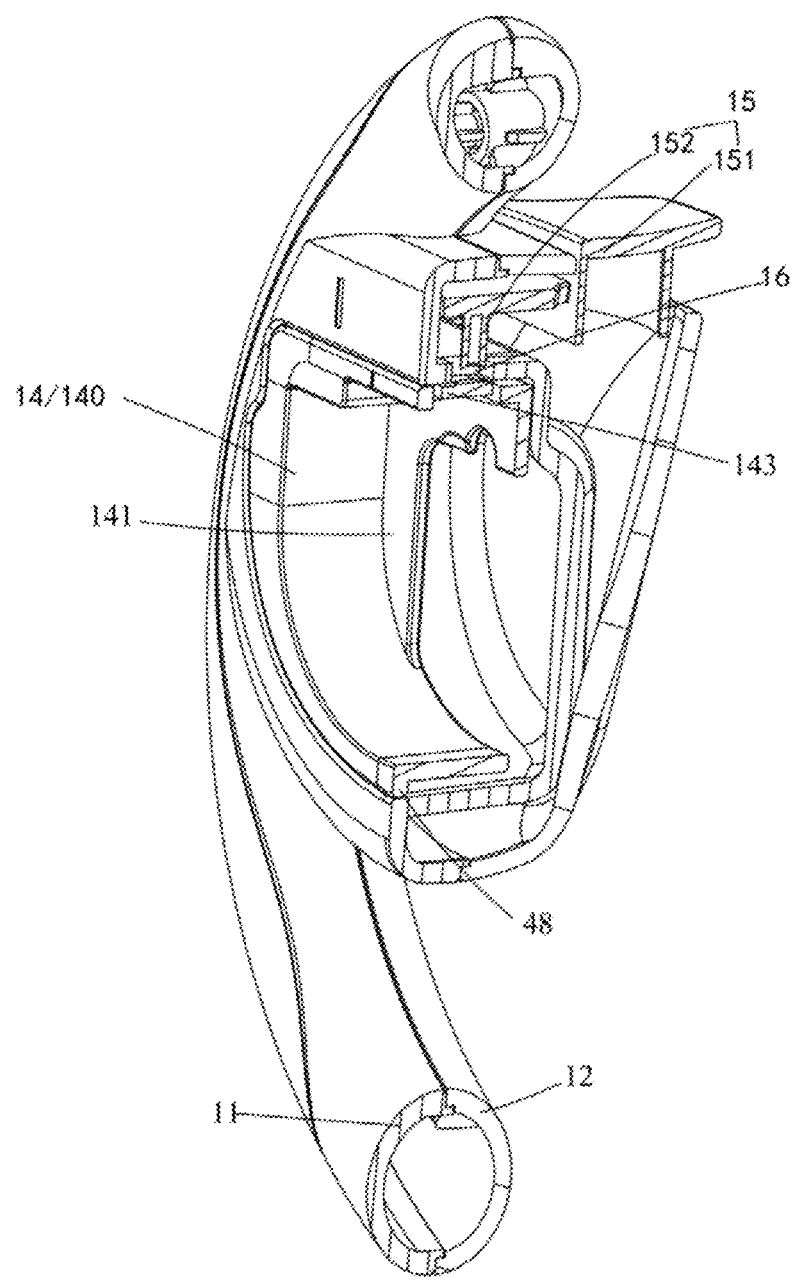
FIG. 3 is the profile of the control key for the embodiment 1 of the gamepad adaptable to different specifications of game console controllers in the invention.
Figure 4:
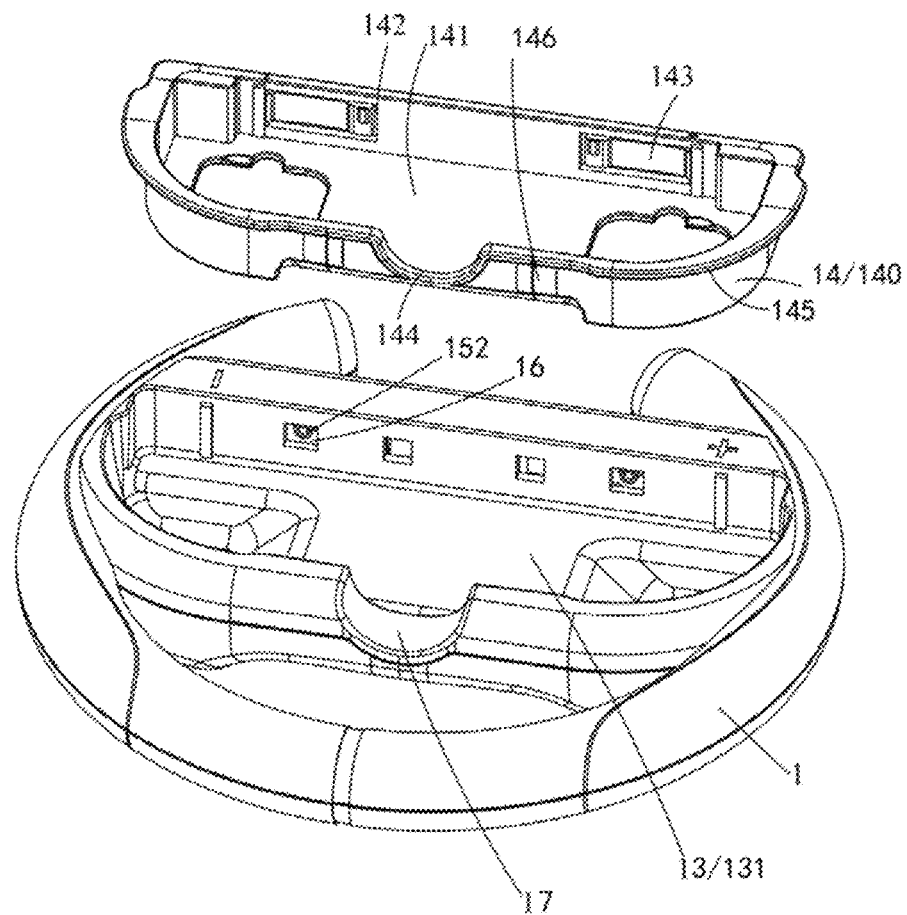
FIG. 4 is the exploded view for the embodiment 1 of the gamepad adaptable to different specifications of game console controllers in the invention.
Figure 5:
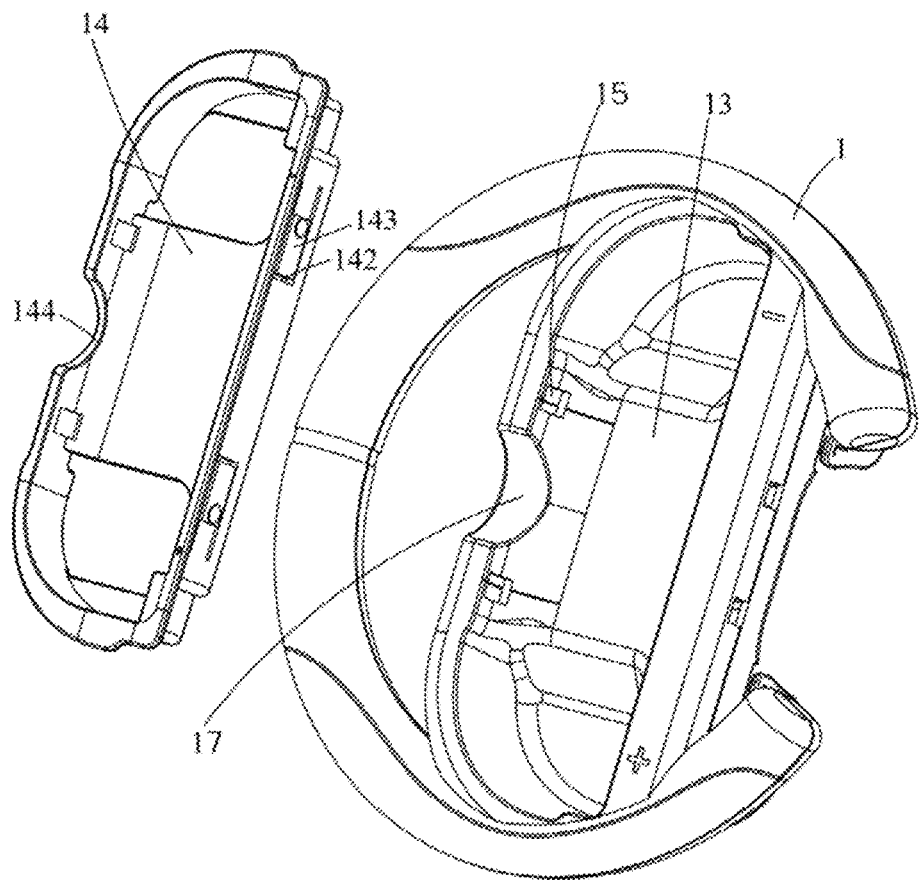
FIG. 5 is the exploded view for the embodiment 1 of the gamepad adaptable to different specifications of game console controllers in the invention in another perspective.
Figure 6:
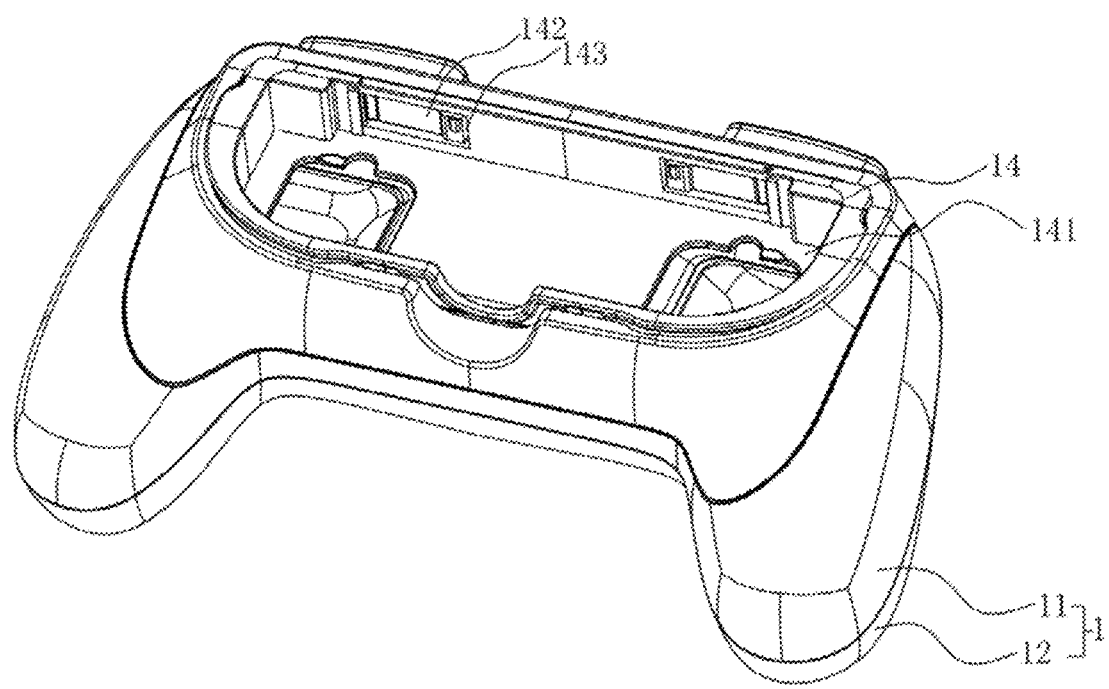
FIG. 6 is the overall structure diagram for the embodiment 2 of the gamepad adaptable to different specifications of game console controllers in the invention.

As shown in FIG. 1 to FIG. 6, the invention provides a gamepad adaptable to different specifications of game console controllers, comprising a gamepad body 1, which is mainly used for the user to hold and place the game console controller and comprises a front shell 11 and a rear shell 12.

The gamepad body 1 is provided with a first mounting structure 13 for placing a first game console controller and a second mounting structure 14 for placing a second game console controller.

The following should be noted:
1. The first mounting structure 13 may be a clamping structure for clamping the game console controller on the left and right sides; however, in order to make the game console controller stably and reliably installed on the gamepad body 1, the first mounting structure 13 is preferably a first controller holding cavity 131 with shape and size adapted to the first game console controller;
2. the second mounting structure 14 can be a clamping structure for clamping the game console controller on the left and right sides; however, in order to make the game console controller stably and reliably installed on the gamepad body 1, the second mounting structure 14 is preferably a second controller holding cavity 14 with shape and size adapted to the first game console controller;
3. the first mounting structure 13 and the second mounting structure 14 can be arranged in different parts of the gamepad body 1; in consideration of not increasing the volume of the gamepad body 1 as much as possible and facilitating the user to hold and control the gamepad, the second mounting structure 14 is preferably arranged as an embedded sleeve 140, and the embedded sleeve 140 is detachably embedded in the first controller holding cavity 131, so that the user can select the corresponding game console controller and the corresponding controller holding cavity as needed.

Specifically, the gamepad body 1 is provided with a switching control key 15 for linkage with a control key on the game console controller, the switching control key 15 comprises a pressing part 151 and a pressing column 152 fixedly connected with the pressing part 151, and the pressing part 151 of the switching control key 15 may be arranged at the front end of a grasping part for the user to hold on the gamepad body 1 (when the user's palm and thumb grip the grasping part, the index finger naturally extends, and the pressing part 151 is located near the front end of the index finger). The gamepad body 1 is provided with a key hole 16 connected with the first controller holding cavity 131, and the pressing column 152 is inserted in the key hole 16; when the first game console controller is installed in the first controller holding cavity 131, the pressing column 152 of the switching control key 15 is linked with the control key of the first game console controller.

By adopting the above technical proposal, the larger first game console controller can be placed directly in the first controller holding cavity 131 when needed, and the switching control key 15 can be enabled to control the corresponding control key on the game console controller by pressing the switching control key 15, and the control key of the first game console controller can be controlled by controlling the switching control key 15.

Specifically, the second mounting structure 14 is provided with a linkage key 143 linked with the switching control key 15, and the linkage key 143 is used for linkage with the control key of the second game console controller and linkage with the linkage key 143 of the second mounting structure 14.

In the embodiment, the embedded sleeve 140 is provided with a linkage slot 142 connected with the second controller holding cavity 141, the linkage key 143 is an elastic arm connected to the side wall of the linkage slot 142 on one side, a gap is provided between the other sides of the elastic arm and the linkage slot 142. When the embedded sleeve 140 is embedded in the first controller holding cavity 131, the pressing part 151 drives the pressing column 152 by pressing the pressing part 151, the pressing column 152 drives the linkage key 143, and the free end of the linkage key 143 presses the control key on the game console controller to control the game console. When the control key is released, the elastic arm automatically resets under the action of elastic force to release the control key on the game console controller.

When a smaller second game controller needs to be placed, the embedded sleeve 140 is embedded in the first controller holding cavity 131, the second game controller is placed in the second controller holding cavity 141, and the linkage key 143 is driven by pressing the switching control key 15 to control the corresponding control key on the game console controller.

Specifically, the gamepad body 1 is provided with a first grasping notch part 17 for easily taking and placing the first game console controller, and the second mounting structure 14 is provided with a second grasping notch part 144 for easily taking and placing the second game console controller. When the second mounting structure 14 is an embedded sleeve 140, the embedded sleeve 140 is embedded in the first controller holding cavity 131, the first grasping notch part 17 corresponds to and is connected with the second grasping notch part 144, and the notch bottom of the second grasping notch part 144 on the embedded sleeve 14 is higher than the notch bottom of the first grasping notch part 17, allowing the embedded sleeve 14 to be easily removed from the first controller holding cavity 131.

When the embedded sleeve 140 is removed, put fingers in the first grasping notch part 17 to easily remove the embedded sleeve 140 from the first grasping notch part 17 or remove the game console controller from the gamepad body 1. When the game console controller needs to be removed from the embedded sleeve 140, put fingers in the second grasping notch part 144 to easily remove the game console controller from the embedded sleeve 140.

In order to facilitate the disassembly of the embedded sleeve 140, the embedded sleeve 140 is provided with a protruding convex flange 145; when the embedded sleeve 140 is embedded in the first controller holding cavity 131, the flange 145 is butted with the gamepad body 1 when the embedded sleeve 140 is embedded in the first controller holding cavity 131, and one side where the flange 145 is butted with the gamepad body 1 preferably has a certain arc to easily remove the embedded sleeve 140 from the first controller holding cavity 131.

Specifically, a sunken clamping slot 18 is arranged on the inside wall of the gamepad body 1 facing towards one side of the first controller holding cavity 131; a protruding convex part 146 is arranged on the outside wall of the embedded sleeve 140; the convex part 146 is clamped in the clamping slot 18. It should be noted that the protruding part 146 and the clamping slot 18 should be arranged to easily remove the embedded sleeve 140 from the gamepad 1, and the embedded sleeve 140 and the gamepad 1 form a stable fit when the protruding part 146 and the clamping slot 18 are combined together.

The above are only preferred embodiments of the invention and are not intended to limit the invention. Any modification, equivalent substitution, improvement, etc. made within the spirit and principles of the invention shall be included within the scope of protection of the invention.

The invention claimed is:

1. A gamepad adaptable to different specifications of game console controllers, comprising a gamepad body provided with a first mounting structure for placing a first game console controller, and a second mounting structure for placing a second game console controller, wherein
 the first mounting structure is a first controller holding cavity, and a shape and size of the first controller holding cavity are adapted to the first game console controller,
 the second mounting structure is an embedded sleeve with a second controller holding cavity, the embedded sleeve is removably embedded in the first controller holding cavity, and a shape and size of the second controller holding cavity are adapted to the second game console controller, and
 the embedded sleeve is provided with a protruding flange, and the flange is butted with the gamepad body when the embedded sleeve is embedded in the first controller holding cavity.

2. The gamepad adaptable to different specifications of game console controllers according to claim 1, wherein the gamepad body is provided with a switching control key linked with control keys on the game console controller, and the switching control key can be linked with the control keys of the first game console controller;
 the second mounting structure is provided with a linkage key connected with the switching control key, and the linkage key is used for linkage with the control keys of the second game console controller.

3. The gamepad adaptable to different specifications of game console controllers according to claim 2, wherein the gamepad body is provided with a key hole connected with the first controller holding cavity, the switching control key comprises a pressing part and a pressing column fixedly connected with the pressing part, and the pressing column is inserted in the key hole and can be linked with the control key of the first game console controller or linked with the linkage key of the second mounting structure.

4. The gamepad adaptable to different specifications of game console controllers according to claim 3, wherein the second mounting structure is provided with a second grabbing notch part for easily taking and placing the second game console controller.

5. The gamepad adaptable to different specifications of game console controllers according to claim 2, wherein the gamepad body is provided with a first grabbing notch part for easily taking and placing the first game console controller.

6. The gamepad adaptable to different specifications of game console controllers according to claim 1, further comprising a sunken clamping slot is arranged on the inside wall of the gamepad body facing towards one side of the first controller holding cavity; a protruding convex part is arranged on the outside wall of the embedded sleeve; the convex part is clamped in the clamping slot.

* * * * *